(12) United States Patent
Naoi

(10) Patent No.: US 8,474,563 B2
(45) Date of Patent: Jul. 2, 2013

(54) FRONTAL STRUCTURE OF VEHICLE

(75) Inventor: Daisuke Naoi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 53 days.

(21) Appl. No.: 13/175,408

(22) Filed: Jul. 1, 2011

(65) Prior Publication Data

US 2012/0001453 A1   Jan. 5, 2012

(30) Foreign Application Priority Data

Jul. 2, 2010   (JP) ................................. 2010-152380

(51) Int. Cl.
  *B62D 25/14*   (2006.01)
(52) U.S. Cl.
  USPC ................................ 180/90; 296/70; 280/779
(58) Field of Classification Search
  USPC ............ 280/779; 296/70, 190.08, 72; 180/90, 180/90.6
  See application file for complete search history.

(56) References Cited

U.S. PATENT DOCUMENTS

| | | | | |
|---|---|---|---|---|
| 5,005,898 | A | * | 4/1991 | Benedetto et al. ....... 296/193.02 |
| 5,082,078 | A | * | 1/1992 | Umeda et al. ................... 180/90 |
| 5,664,823 | A | * | 9/1997 | Misra et al. ...................... 296/70 |
| 6,305,733 | B1 | * | 10/2001 | Rahmstorf et al. .............. 296/70 |
| 6,585,068 | B2 | * | 7/2003 | Matsushita ....................... 180/90 |
| 6,601,902 | B1 | * | 8/2003 | Rahmstorf et al. .............. 296/70 |
| 6,601,909 | B2 | * | 8/2003 | Obara et al. .................... 296/191 |
| 6,817,657 | B2 | * | 11/2004 | Watanabe et al. ........ 296/203.02 |
| 6,890,016 | B2 | * | 5/2005 | Brancheriau .................... 296/70 |
| 7,445,242 | B2 | * | 11/2008 | Yamaguchi et al. .......... 280/780 |
| 7,484,760 | B2 | * | 2/2009 | Suzuki et al. .................. 280/779 |
| 7,963,589 | B2 | * | 6/2011 | Baudart .................... 296/193.02 |
| 2003/0122404 | A1 | * | 7/2003 | Duchez .......................... 296/208 |
| 2004/0108744 | A1 | * | 6/2004 | Scheib et al. .................... 296/70 |
| 2006/0108782 | A1 | * | 5/2006 | Kanazawa et al. ............ 280/779 |
| 2006/0145506 | A1 | * | 7/2006 | Braun et al. ..................... 296/70 |
| 2009/0174216 | A1 | * | 7/2009 | Penner ............................. 296/72 |
| 2009/0200784 | A1 | * | 8/2009 | Braun et al. ................... 280/779 |
| 2010/0101090 | A1 | * | 4/2010 | Nakano et al. ............... 29/897.2 |

FOREIGN PATENT DOCUMENTS

| | | |
|---|---|---|
| JP | 59-150678 U | 10/1984 |
| JP | 5-24471 | 3/1993 |
| JP | 08-324440 | 12/1996 |
| JP | 09-030449 | 2/1997 |
| JP | 2001-010537 | 1/2001 |
| JP | 2003-191862 | 7/2003 |
| JP | 2004-299633 | 10/2004 |
| JP | 2006-117097 | 5/2006 |

OTHER PUBLICATIONS

JP Notice of Allowance, Application No. 2010-152380, Mailed Jan. 10, 2012, six pages.

* cited by examiner

*Primary Examiner* — Joseph Rocca
*Assistant Examiner* — Timothy Wilhelm
(74) *Attorney, Agent, or Firm* — Rankin, Hill & Clark LLP

(57) ABSTRACT

A frontal structure of a vehicle includes: a dashboard lower section; a dashboard lower cross member, positioned at a front surface of the dashboard lower section, and divided into a left part and a right part; a dashboard cross member integrally formed by connecting and welding the dashboard lower cross member to a steering joint cover; and an acceleration pedal bracket fixed to an overlapping part of the steering joint cover and the dashboard lower section.

12 Claims, 7 Drawing Sheets

FRONTAL STRUCTURE OF VEHICLE

TECHNICAL FIELD

The present invention relates to a frontal structure of a vehicle.

Priority is claimed on Japanese Patent Application No. 2010-152380, filed Jul. 2, 2010, the content of which is incorporated herein by reference.

BACKGROUND ART

An acceleration pedal and the like is provided on a dashboard lower section (dashboard lower panel) separating an engine room from a cabin (vehicle chamber). The dashboard lower section is a component simply separating the engine room from the cabin. Therefore, the dashboard lower section is often made of a thin plate in order to reduce the weight of the dashboard lower section. In such a case, it is difficult to support the acceleration pedal with only the dashboard lower section. As a result, the acceleration pedal is attached to the dashboard lower section via an acceleration pedal bracket.

Here, the acceleration pedal bracket needs an adequate amount of supporting rigidity. Various configurations have been suggested to efficiently enhance the supporting rigidity.

For example, an acceleration pedal stopper is placed between a brake pedal bracket and the acceleration pedal bracket. The acceleration pedal bracket is provided below the brake pedal bracket. An upper bent end part of the acceleration pedal stopper is fixed to a wide-width flange of the brake pedal bracket. Meanwhile, a lower bent end part of the acceleration pedal stopper is fixed to an upper surface of the acceleration pedal bracket. (See, for example, Japanese Unexamined Utility Model Application, First Publication No. H5-24471 (hereinafter referred to as "Patent Document 1").)

According to Patent Document 1, the acceleration pedal stopper is placed between the brake pedal bracket and the acceleration pedal bracket. Each of the ends of the acceleration pedal stopper is respectively fixed to both pedal brackets. The brake pedal bracket is fixed tightly to a vehicle body. Meanwhile, the acceleration pedal bracket is supported via the acceleration pedal stopper. As a result, the rigidity of the acceleration pedal bracket increases. Furthermore, the rigidity of the acceleration pedal stopper also increases as well.

However, according to the conventional technology described above, it is necessary to place the brake pedal bracket close to the acceleration pedal bracket. Therefore, there is a problem in that the freedom in design decreases.

DISCLOSURE OF INVENTION

The present invention is made according to the considerations described above. Hence, an object of the present invention is to provide a frontal structure of a vehicle which can improve the degree of freedom in design, and can efficiently enhance the supporting rigidity of an acceleration pedal bracket.

In order to solve the above problems, a frontal structure of a vehicle employs the following configuration:

(1) An aspect of the present invention is a frontal structure of a vehicle including a dashboard lower section; a dashboard lower cross member, positioned at a front surface of the dashboard lower section, and divided into a left part and a right part; a dashboard cross member integrally formed by connecting and welding the dashboard lower cross member to a steering joint cover; and an acceleration pedal bracket fixed to an overlapping part of the steering joint cover and the dashboard lower section.

(2) An aspect of the present invention is a frontal structure of a vehicle including a dashboard lower section; a steering joint cover provided on a surface of the dashboard lower section at an engine room side; a joint member connecting a steering shaft side of the dashboard lower section and a steering gear box side of the dashboard lower section; a dashboard cross member extending along a left and right direction of the dashboard lower section; and an acceleration pedal bracket. Here, the steering joint cover is formed to surround the joint member. In addition, the dashboard cross member is divided into a left cross member, positioned at a left side, and a right cross member, positioned at a right side. Further, the left cross member is welded to the right cross member via the steering joint cover. In addition, the left cross member, the right cross member, and the steering joint cover are integrated. Moreover, the acceleration pedal bracket is provided at an overlapping part of the dashboard lower section and the steering joint cover.

An overlapping part of the dashboard lower section and the steering joint cover has a higher rigidity because the dashboard lower section and the steering joint cover are overlapping with one another. Further, by fixing the acceleration pedal bracket to this overlapping part, it is possible to efficiently enhance the supporting rigidity of the acceleration pedal bracket.

Further, unlike conventional technology, it is possible to enhance the supporting rigidity of the acceleration pedal bracket without placing a brake pedal bracket near the acceleration pedal bracket. Therefore, it is possible to improve the freedom in design.

(3) The frontal structure of a vehicle may be configured as follows: the dashboard lower section includes a longitudinal wall and a tilted wall extending and sloping from a lower part of the longitudinal wall towards a rear direction. Further, the steering joint cover is positioned near a boundary part between the longitudinal wall and the tilted wall.

The boundary part between a longitudinal wall and a tilted wall is bent. A steering joint cover is placed at this boundary part. As a result, it is possible to increase the amount of space between the dashboard lower section and the steering joint cover. Thus, it is possible to surround a joint component with reliability without making the size of the steering joint cover unnecessarily large.

Here, a steering grommet may be provided in order to enhance the degree with which an interior of the steering joint cover is sealed. The steering grommet is provided at a surface opposite to the surface at which a steering joint cover of the dashboard lower section is attached. In such a case, the steering grommet is fixed by inserting an attachment clip of the steering grommet inside the dashboard lower section. When this attachment clip is inserted into the dashboard lower section, the attachment clip sticks out towards a steering joint cover side. However, since there is ample amount of space between the dashboard lower section and the steering joint cover, it is possible to prevent the attachment clip from interfering with the steering joint cover.

(4) The frontal structure of a vehicle may be configured as follows: the steering joint cover is fixed to the dashboard lower section via a sealing material provided between the steering joint cover and the dashboard lower section.

According to this configuration, it is possible to prevent dust and water from entering from between the dashboard lower section and the steering joint cover.

(5) The frontal structure of a vehicle may be configured as follows: the dashboard cross member is positioned along the boundary part between the longitudinal wall and the tilted wall. In addition, the left cross member is welded to a left front side frame provided at a left side of the dashboard lower section. Further, the right cross member is welded to a right front side frame provided at a right side of the dashboard lower section.

According to this configuration, it is possible to enhance the rigidity of the dashboard lower section.

(6) The frontal structure of a vehicle may be configured as follows: a thickness of the steering joint cover is greater than a thickness of the dashboard cross member. In addition, the dashboard cross member is linear.

According to this configuration, it is possible to enhance the supporting rigidity which is used for supporting a joint component. At the same time, it is possible to further enhance the rigidity of the dashboard lower section.

In addition, as a result of the rigidity of the steering joint cover being enhanced, the supporting rigidity of the acceleration pedal bracket may be further enhanced as well.

According to the present invention, the dashboard lower section and the steering joint cover overlaps with one another. Due to this overlapping part, the rigidity is enhanced. Since the acceleration pedal bracket is fixed to this overlapping part, it is possible to efficiently enhance the supporting rigidity of the acceleration pedal bracket.

Further, unlike conventional technology, it is possible to enhance the supporting rigidity of the acceleration pedal bracket without placing a brake pedal bracket near the acceleration pedal bracket. Therefore, it is possible to improve the freedom in design.

BEST MODE FOR CARRYING OUT THE INVENTION (Frontal Structure of Vehicle)
(Dashboard Lower Section)

Hereunder, an embodiment of a frontal structure of a vehicle according to an aspect of the present invention is described with reference to the drawings. In the following description, a frontal direction in which the vehicle is moving may be simply referred to as a "frontal direction," a rear direction which is opposite to the direction in which the vehicle is moving may be simply referred to as a "rear direction," a direction to the right in the vehicle width direction may be simply referred to as a "right direction," a direction to the left in the vehicle width direction may be simply referred to as a "left direction," an upward direction which is opposite to the direction of the gravitational force may be simply referred to as an "upper direction," and a lower direction which corresponds to the direction of the gravitational force applies may be simply referred to as a "lower direction."

Figure 1:
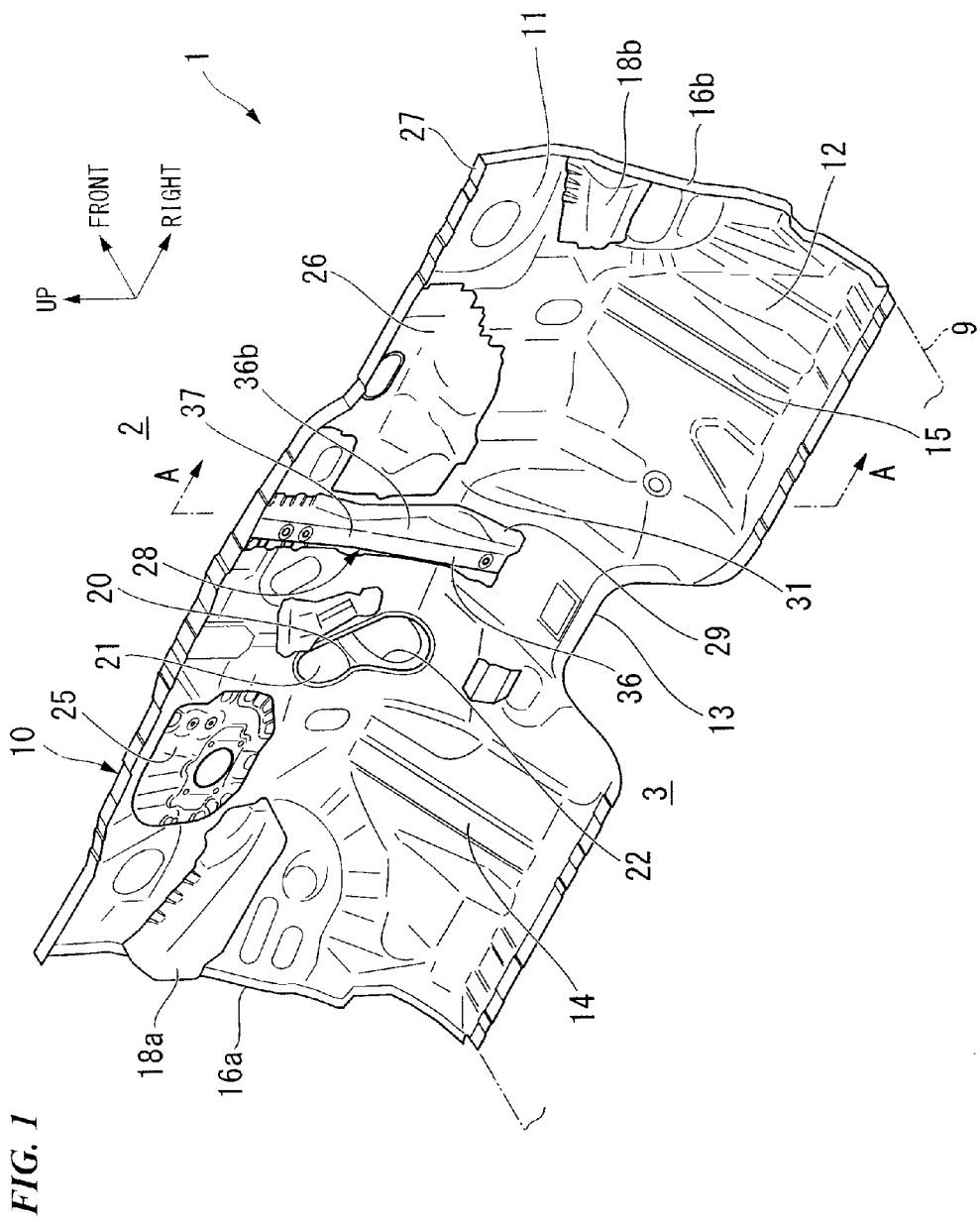
FIG. 1 is a perspective view of a dashboard lower section according to an embodiment of the present invention seen from a cabin side.
Figure 2:
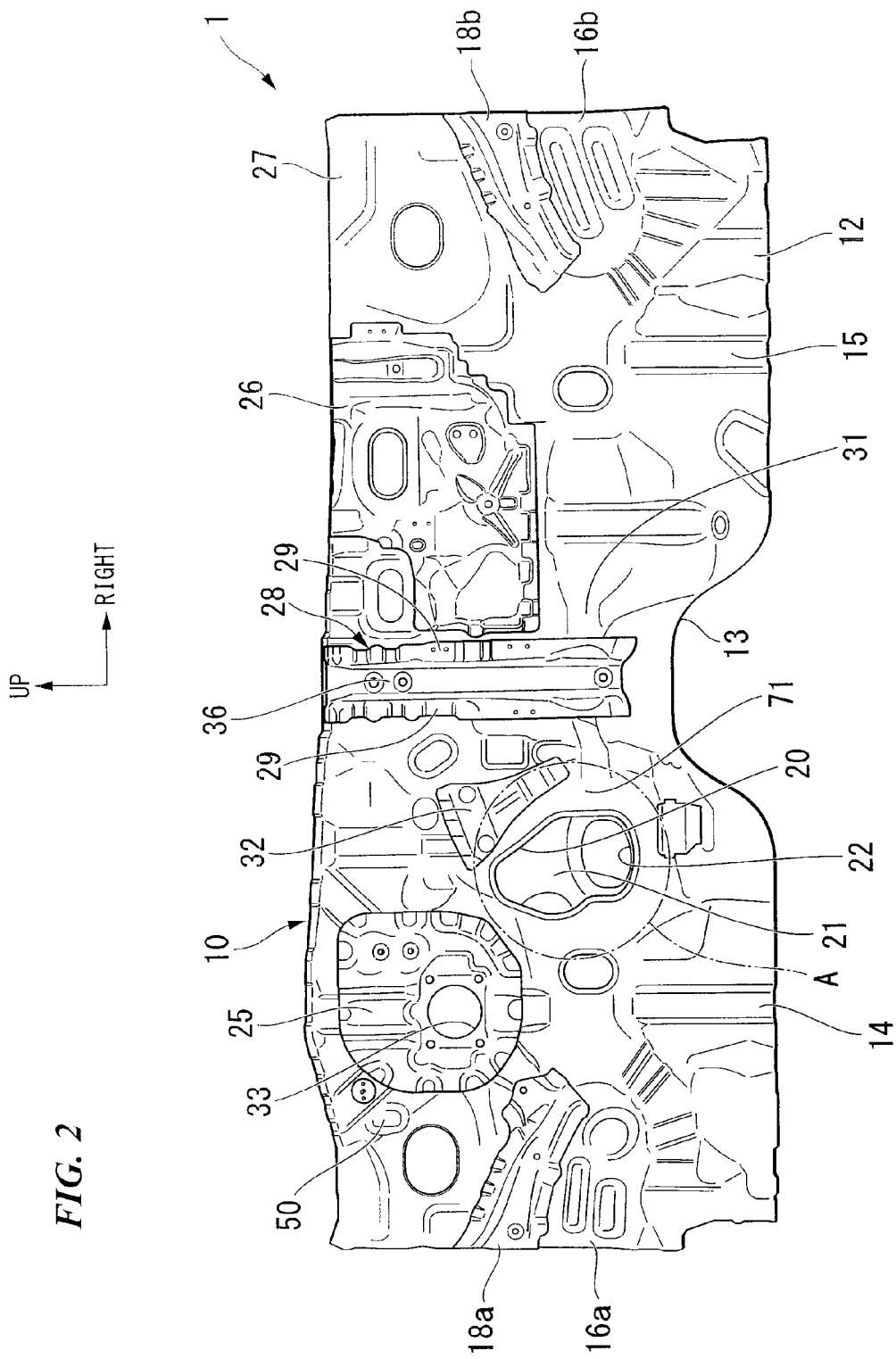
FIG. 2 is a planar view of a dashboard lower section according to the above embodiment seen from a cabin side.
Figure 3:
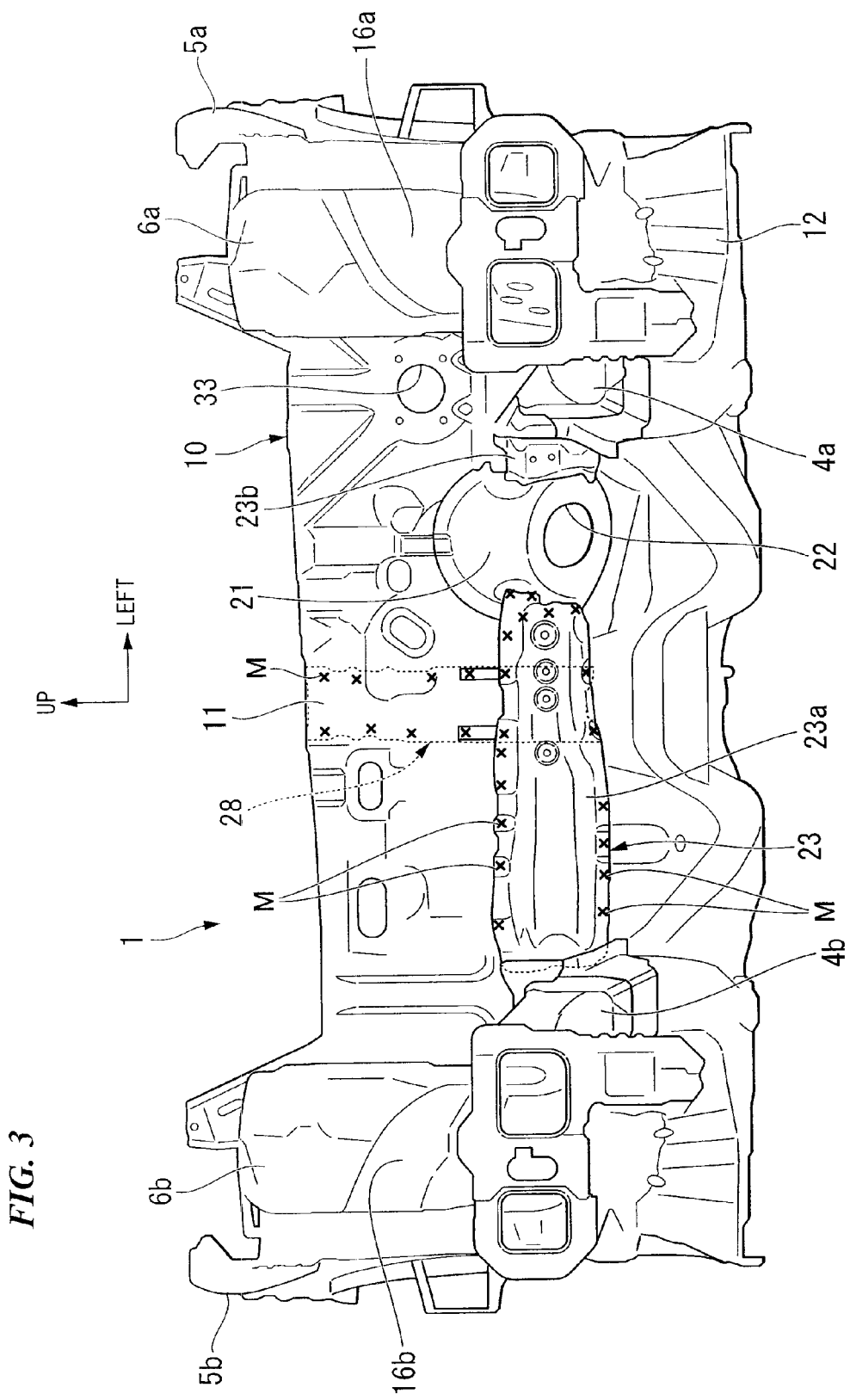
FIG. 3 is a planar view of a dashboard lower section according to the above embodiment seen from an engine room side.

FIG. 1 is a perspective view of a dashboard lower section according to an embodiment of the present invention seen from a cabin side. FIG. 2 is a planar view of the dashboard lower section seen from the cabin side. FIG. 3 is a planar view of the dashboard lower section seen from an engine room side.

As shown in FIGS. 1-3, a vehicle frontal structure 1 includes a frontal side frame 4a, 4b, a front pillar 5a, 5b, an upper member 6a, 6b, a dashboard lower section 10, and a floor panel 9. The frontal side frame 4a, 4b is positioned at a frontal side. A pair of frontal side frames 4a, 4b make up the left and right frames of an engine frame 2. The front pillar 5a, 5b is placed at a rear side with respect to the frontal side frames 4a, 4b. At the same time, the front pillar 5a, 5b is placed at the left and right outer sides with respect to the frontal side frame 4a, 4b. Further, the front pillar 5a, 5b extends in the upper-lower direction. The upper member 6a, 6b is placed above the front side frames 4a, 4b. The front ends of each of the upper members 6a, 6b are welded to the front ends of the front side frame 4a, 4b. The rear ends of each of the upper members 6a, 6b are welded to the front pillar 5a, 5b. The dashboard lower section 10 separates the engine room 2 and the cabin 3 positioned behind the engine room 2. The dashboard lower section 10 is welded to the front side frames 4a, 4b, the front pillars 5a, 5b, and the upper members 6a, 6b. The floor panel 9 is welded to a lower rim of the dashboard lower section 10.

The dashboard lower section 10 is formed by applying a pressing operation to a planar metallic component. The dashboard lower section 10 comprises a longitudinal wall 11, a tilted wall 12, and a wheel housing part 16a, 16b. The longitudinal wall 11 is positioned along an upper-lower direction. The tilted wall 12 is extended as a descending slope from a lower portion of the longitudinal wall 11 in a rear direction. The wheel housing parts 16a, 16b are provided respectively on the left and right sides.

Each of the wheel housing parts 16a, 16b is formed so as to bulge towards a cabin 3 side. A gazette 18a is provided at an upper part of the wheel housing part 16a. A gazette 18b is provided at an upper part of the wheel housing part 16b.

The rear ends of each of the front side frames 4a, 4b are spot-welded to the central end part, with respect to the vehicle width direction, of each of the gazettes 18a, 18b. The dashboard lower section 10 is placed between the gazette 18a and the front side frame 4a, and between the gazette 18b and the front side frame 4b. On the other hand, the front pillar 5a is spot-welded to an outer side end part, with respect to the vehicle width direction, of the gazette 18a. Further, the front pillar 5b is spot-welded to an outer side end part, with respect to the vehicle width direction, of the gazette 18b.

A bend section 27 is formed at an upper rim of the longitudinal wall 11 of the dashboard lower section 10. The bend section 27 bends and extends towards the rear direction. A plurality of beads 49 are formed on the bend section 27 along the front-rear direction. The beads 49 protrude upwards, and are placed along the longitudinal direction of the bend section 27.

On the other hand, a tunnel part 13 is integrally formed to a central section, with respect to the vehicle width direction, of the tilted wall 12. The tunnel part 13 expands upwards. A driver-seat-side step part 14 is positioned to the left of the tunnel part 13. A passenger-seat-side step part 15 is positioned to the right of the tunnel part 13. The tunnel part 13 is placed between the driver-seat-side step part 14 and the passenger-seat-side step part 15.

Further, a center frame 28 is provided between the bend section 27 of the longitudinal wall 11 and the tunnel part 13. The center frame 28 extends in the upper-lower direction. This center frame 28 is a reinforcing member that enhances the rigidity of the dashboard lower section 10.

An opening 20 for a steering wheel is formed at a boundary part 71 of the driver-seat-side step part 14 between the longitudinal wall 11 and the tilted wall 12. The opening 20 for steering connects the engine room 2 and the cabin 3. A steering shaft 72 and a universal joint 76, described later, are inserted into the opening 20 for a steering wheel. A steering joint cover 21 is attached to the opening 20 for steering. The steering joint cover 21 seals the opening 20 for steering.

(Steering Joint Cover)

Figure 4:
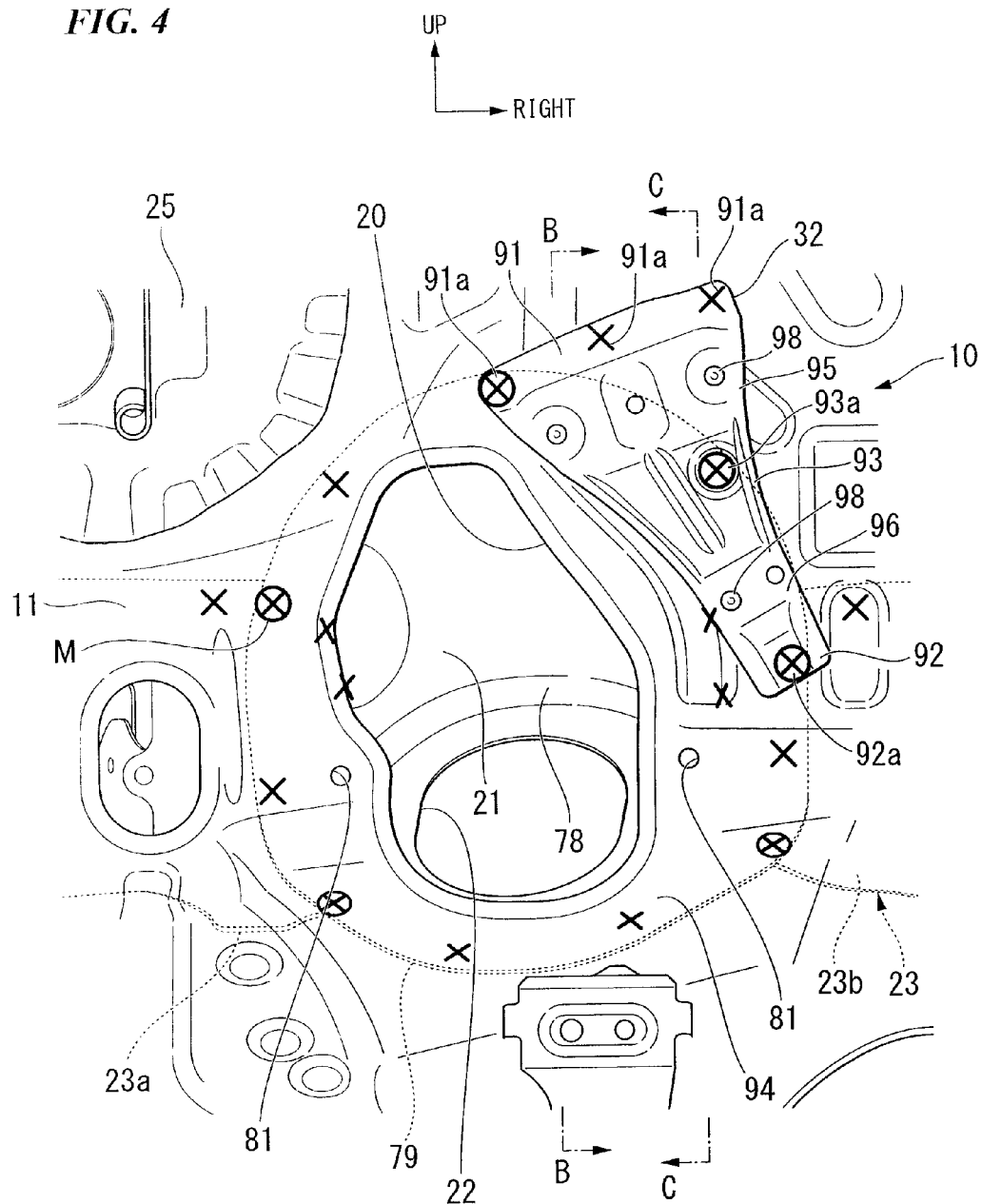
FIG. 4 is an enlarged view of portion A in FIG. 2.
Figure 5:
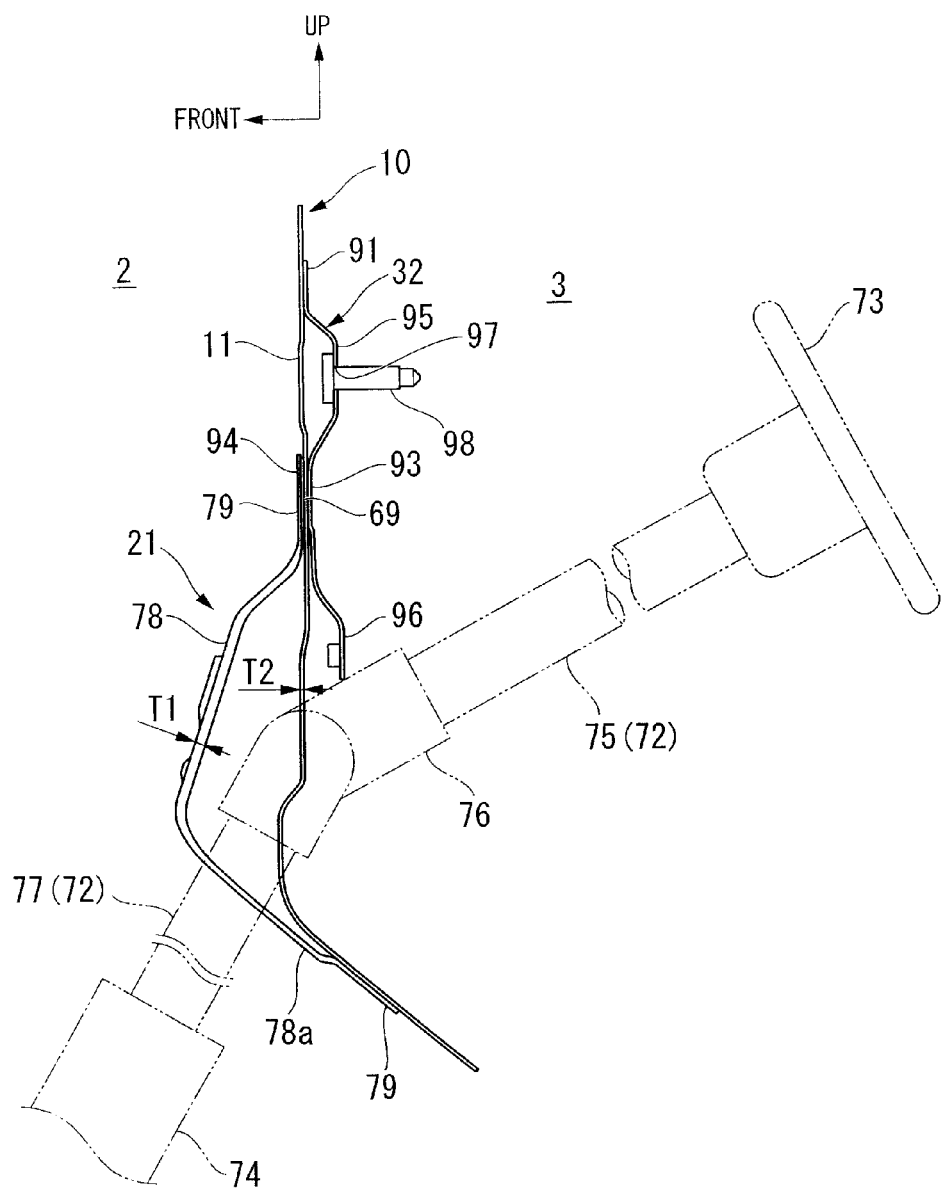
FIG. 5 is a cross sectional view of along line B-B in FIG. 4.
Figure 6:
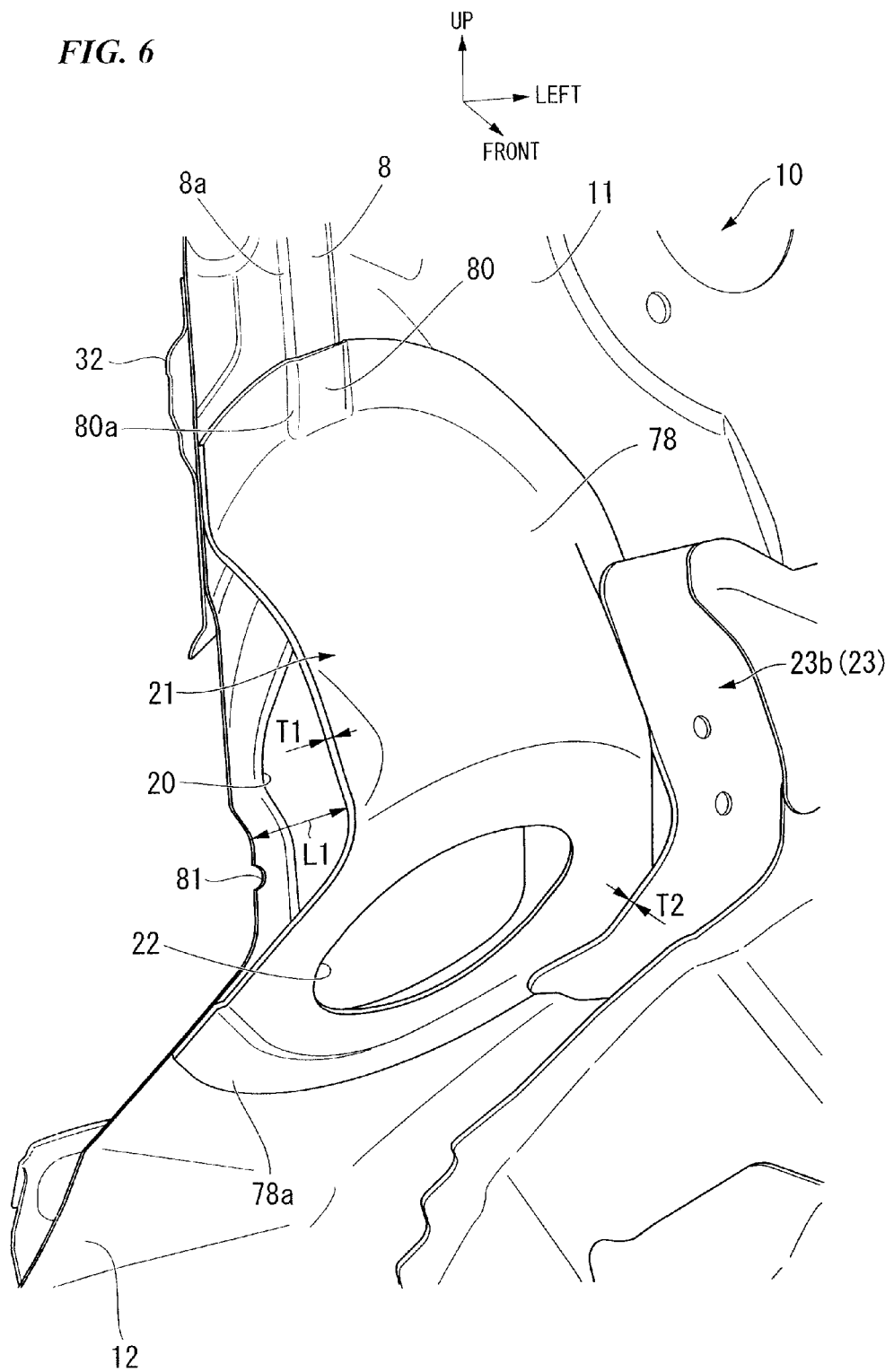
FIG. 6 is a perspective cross sectional view along line C-C in FIG. 4.

FIG. 4 is an enlarged view of portion A in FIG. 2. FIG. 5 is a cross sectional view of along line B-B in FIG. 4. FIG. 6 is a perspective cross sectional view along line C-C in FIG. 4.

Here, a steering shaft 72 is described. The steering shaft 72 is inserted in the opening 20 for steering. As shown in FIGS. 3-6, the steering shaft 72 is a mechanism transmitting a rotation of a steering handle 73 to a steering gear box 74. The steering handle 73 is provided at a cabin 3 side. The steering gear box 74 is provided at an engine room 2 side.

The steering shaft 72 includes a first shaft 75 and a second shaft 77. The first shaft 75 is connected to a lower end of the steering handle 73. An end of the second shaft 77 is connected to a lower end of the first shaft 75 via a universal joint 76. The end of the second shaft 77 is connected to the lower end of the first shaft 75 so that the end of the second shaft 77 is bendable. Furthermore, another end of the second shaft 77 is connected to the steering gear box 74.

A steering joint cover 21 is attached to the dashboard lower section 10 at a location surrounding the opening 20 for steering from the engine room 2 side. The steering joint cover 21 covers the opening 20 for steering.

In further detail, the steering joint cover 21 includes a cover main body 78 and an outer flange part 79. The cover main body 78 is shaped like a cup. The cover main body 78 expands towards the engine room 2 side. The outer flange part 79 is formed at a rim of an opening of the cover main body 78.

The rim of the opening of the cover main body 78 is positioned at an outer side of the opening 20 for steering formed on the dashboard lower section 10. A joint insertion opening 22 is formed at a bottom wall 78a of the cover main body 78. The steering shaft 72 and the universal joint 76 are inserted in the joint insertion opening 22.

Meanwhile, a flange bead 80 is formed at an upper part of the outer flange part 79. The outer flange part 79 is spot welded to the dashboard lower section 10. A sealing material 69 is provided between the outer flange part 79 and the dashboard lower section 10.

Here, a bead 8 is formed on the dashboard lower section 10 at a position corresponding to the flange bead 80. In other words, a ridge line 80a of the flange bead 80 and a ridge line 8a of the bead 8 overlap with one another.

In addition, a pair of grommet attachment holes 81, 81 are formed near a boundary part 71 of the dashboard lower section 10 at both sides of the opening 20 for steering. The opening 20 for steering is provided between the pair of grommet attachment holes 81, 81. The pair of grommet attachment holes 81, 81 are provided at an inner side with respect to the steering joint cover 21. A steering grommet 82, described later, is attached to the grommet attachment holes 81, 81.

(Acceleration Pedal Bracket)

Further, as shown in FIGS. 4 and 5, an acceleration pedal bracket 32 is provided at a surface of the dashboard lower section 10 at a cabin 3 side. The acceleration pedal bracket 32 is provided at an upper right location with respect to the opening 20 for steering. The acceleration pedal bracket 32 is a metallic reinforcing plate used to attach an acceleration pedal (not diagrammed). The radius of the acceleration pedal bracket 32 gradually decreases from the upper end part 91 towards the lower end part 92 at a lower right diagonal side.

Further, three spot welding parts 91a are provided at an upper end part 91 with equal intervals. At the same time, a spot welding part 92a is provided at a lower end part 92. In addition, a spot welding part 93a is provided at a central part 93 between the upper end part 91 and the lower end part 92.

Here, a rim of an opening of the cover main body 78 of the steering joint cover 21 is formed to be positioned at an outer side of the opening 20 for steering. The steering joint cover 21 is provided at a surface of the dashboard lower section 10 at an engine room 2 side. As a result, the acceleration pedal bracket 32 is positioned at an opposite side of the steering joint cover 21. The dashboard lower section 10 is provided between the steering joint cover 21 and the acceleration pedal bracket 32.

Furthermore, among the spot welding part 91a of the upper end part 91 of the acceleration pedal bracket 32, the spot welding part 91a at the left end, the spot welding part 92a at the lower end 92, and the spot welding part 93a at the central part 93 are each positioned at an overlapping part 94. This overlapping part 94 is provided by an overlapping of the dashboard lower section 10 and the outer flange part 79 of the steering joint cover 21. In other words, by performing a spot welding on these spot welding parts 91a, 92a, and 93a, it is possible to weld three metallic plates at once. These three metallic plates are the outer flange part 79 of the steering joint cover 21, the dashboard lower section 10, and the acceleration pedal bracket 32.

Furthermore, a protruding portion 95 is formed at an acceleration pedal bracket 32 between the upper end part 91 and the central part 93. A protruding portion 96 is formed at the acceleration pedal bracket 32 between the central part 93 and the lower end part 92. The protruding portions 95, 96 protrude towards the cabin 3 side. These protruding portions 95, 96 are components configured to be a bearing surface for attaching an acceleration pedal (not diagrammed). A plurality of screw holes 97 are formed on the protruding portions 95, 96. A screw 98 is inserted to this screw hole 97 from the engine room 2 side in order to attach an acceleration pedal (not diagrammed).

A steering grommet 82 is provided at a cabin 3 side of the opening 20 for steering so as to prevent any interference with the acceleration pedal bracket 32, attached as described above. (See FIG. 7.)

(Steering Grommet)

Figure 7:
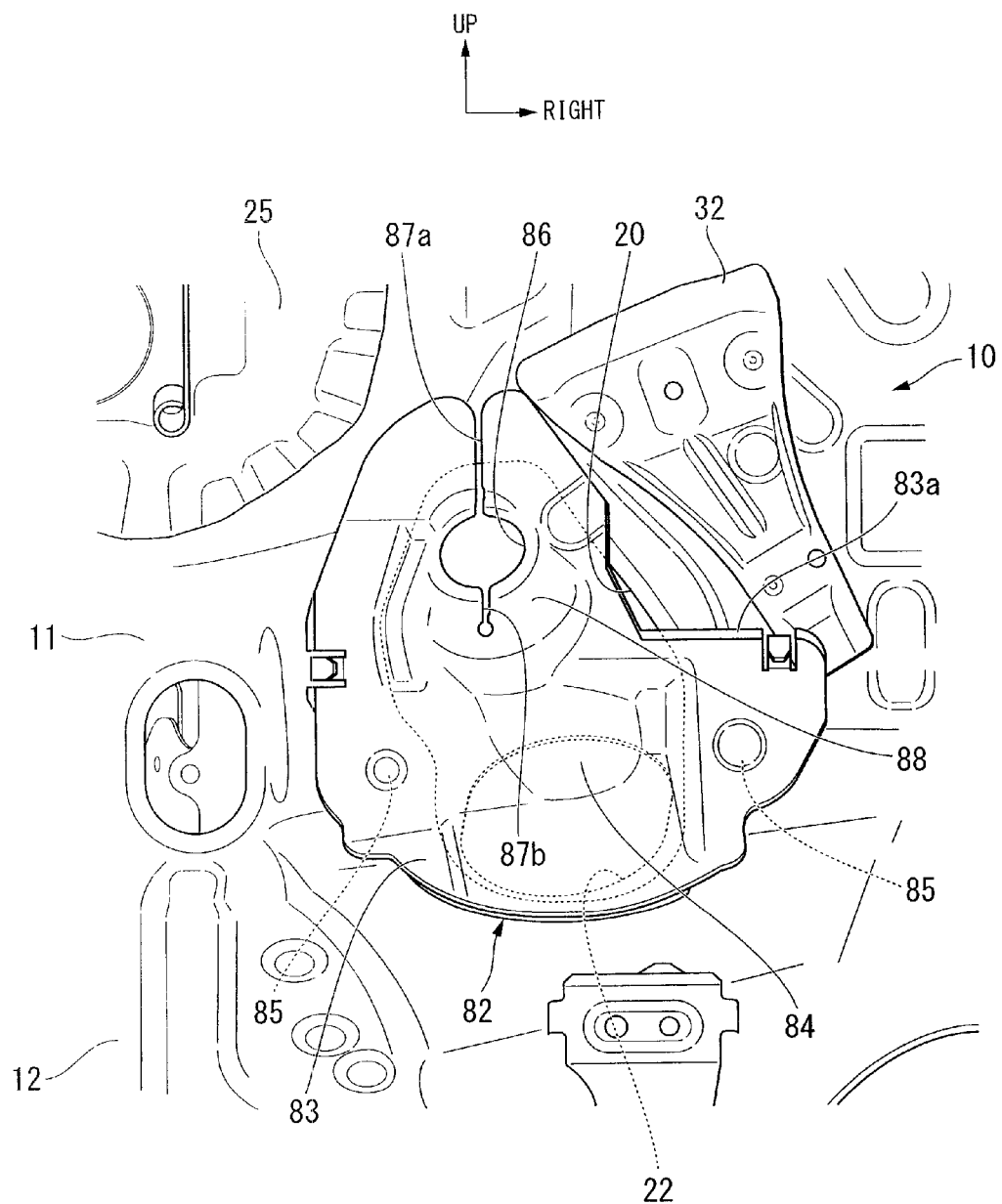
FIG. 7 is a perspective view of a steering grommet according to the above embodiment.

FIG. 7 is a perspective view of a steering grommet.

As shown in FIG. 7, the steering grommet 82 is made of resin. The steering grommet 82 is provided at a cabin 3 side of the dashboard lower section 10 so as to seal the opening 20 for steering. The steering grommet 82 includes a flange part 83 and a grommet main body 84. The flange part 83 seals the opening 20 for steering. The grommet main body 84 protrudes from a central part of the flange part 83 towards the cabin 3 side.

The flange part 83 is formed to be larger than the opening 20 for steering. At the same time, a cut out portion 83a is formed at a position corresponding to the acceleration pedal bracket 32. By forming this cut out portion 83a, it is possible to prevent any interference between the steering grommet 82 and the acceleration pedal bracket 32.

The attachment clip 85, 85 is provided at a component at which an outer peripheral portion of the flange part 83 and a peripheral of the opening 20 for steering overlap with one another. The attachment clip 85, 85 protrudes towards an engine room side. The attachment clip 85, 85 is provided at a position corresponding to the grommet attachment hole 81, 81 formed on the dashboard lower section 10.

When the attachment clips 85, 85 are inserted respectively into the grommet attachment holes 81, 81, the attachment clips 85, 85 protrude from the dashboard lower section 10 towards the engine room 2 side. In other words, the attachment clips 85, 85 protrude towards the steering joint cover 21 side. In this way, the attachment clips 85, 85 are latched to the grommet attachment holes 81, 81. As a result, the steering grommet 82 is fixed to the dashboard lower section 10.

Here, the steering joint cover 21 is attached so as to seal the opening 20 for steering. Thus, the steering joint cover 21 is provided on the boundary part 71 of the dashboard lower section 10. The boundary part 71 is a component connecting the longitudinal wall 11 with the tilted wall 12. As a result, the boundary part 71 is bent. The steering joint cover 21 is attached to this boundary part 71. Therefore, an adequate amount of distance L1 (see FIG. 6) between the dashboard lower section 10 and the cover main body 78 of the steering joint cover 21 is obtained.

In addition, a grommet attachment hole 81 is formed near the boundary part 71 of the dashboard lower section 10. In other words, the attachment clip 85 of the steering grommet 82 protrudes at an area between the dashboard lower section 10 and the cover main body 78 of the steering joint cover 21, at which adequate amount of space is provided. Therefore, it is possible to prevent any interference between the attachment clip 85 and the steering joint cover 21.

Meanwhile, a grommet main body 84 is configured so that a part of a cylindrical component, formed to surround the steering shaft 72, is placed diagonally along an axial direction of the steering shaft 72 (first shaft 75), thereby being uplifted from the flange part 83. In other words, the grommet main body 84 is configured so that a shaft insertion entrance 86, formed on the tip of the grommet main body 84, is formed towards a diagonal upper direction. Further, a tip tapering part 88 is formed at the tip of the grommet main body 84.

Moreover, a pair of slits 87a, 87b are formed in the upper-lower direction around the rim of the shaft insertion opening 86. Due to these slits 87a, 87b, the tip tapering part 88 of the grommet main body 84 is formed to be flexible. Among the pair of slits 87a, 87b, the slit 87a, formed in the upper direction, is formed at a space between a peripheral rim of the shaft insertion opening 86 and an outer peripheral rim of the flange part 83. As a result, the steering grommet 82 can be easily assembled to the steering shaft 72.

(Dashboard Cross Member)

Returning to FIG. 3, a dashboard cross member 23 is provided in a linear manner on a surface of the dashboard lower section 10 at an engine room 2 side. The dashboard cross member 23 bridges the left and right front side frames 4a, 4b. The dashboard cross member 23 is provided at a position corresponding to the steering joint cover 21. The steering joint cover 21 is provided on the boundary part 71 of the dashboard lower section 10. Thus, the dashboard cross member is provided along the boundary part 71.

The dashboard cross member 23 is used to enhance the rigidity of the dashboard lower section 10 or to scatter a frontal collision load. The dashboard cross member 23 is formed so that the cross section of the dashboard cross member 23 is shaped as a hat. A closed cross sectional structure is formed by spot-welding an opening side of the dashboard cross member 23 towards the dashboard lower section 10 side.

Furthermore, the steering joint cover 21 divides the dashboard cross member 23 into left and right portions. In other words, the dashboard cross member includes a left cross member 23a and a right cross member 23b.

In addition, an end of each of the left and right cross members 23a, 23b is spot-welded to the steering joint cover 21. In other words, the left and right cross members 23a, 23b are connected to one another via the steering joint cover 21. Meanwhile, an other end of the left cross member 23a is spot-welded to the left front side frame 4a, which is placed at a left side. Furthermore, an other end of the right cross member 23b is spot-welded to the right front side frame 4b, which is placed at a right side.

Incidentally, the reference M in FIGS. 3 and 4 refer to a spot-welding portion at which the dashboard lower section 10, the steering joint cover 21, the dashboard cross member 23, the master cylinder stiffener 25, a damping material fixing panel 26 (described later), and a center frame 28 are spot-welded.

Here, the thickness T1 of the steering joint cover 21 is set to be greater than the thickness T2 of the dashboard cross member 23 (see FIG. 6). As a result, it is possible for the steering joint cover 21 to enhance the supporting rigidity of the steering shaft 72 and the universal joint 76.

A concaved part 31 is formed on a surface of the dashboard lower section 10 at a cabin 3 side at a position corresponding to the right cross member 23b. The concaved part 31 is configured to be elongated in the left-right direction. The concaved part 31 is formed by bulging the dashboard lower section 10 towards the engine room 2 side. As a result, it is possible to further enhance the rigidity of the component corresponding to the dashboard cross member 23 of the dashboard lower section 10.

In addition, an attachment hole 33 is formed on a surface of the longitudinal wall 11 at the cabin 3 side included in the dashboard lower section 10. The attachment hole 33 is positioned towards an upper left side with respect to the opening 20 for steering. The attachment hole 33 is used to attach a brake master cylinder which is not diagrammed.

A master cylinder stiffener 25 is provided around the attachment hole 33. The master cylinder stiffener 25 is configured so that a pressing operation is made on a planar metallic component to form an irregular surface. A brake master cylinder (not diagrammed) is attached to this master cylinder stiffener 25.

Furthermore, a damping material fixing panel 26 is provided on the longitudinal wall 11 at an upper right side with respect to the tunnel part 13. The damping material fixing panel 26 is used to fix a melting sheet (not diagrammed). The melting sheet is attached as a damping material of the dashboard lower section 10. The damping material fixing panel 26 is configured so that a pressing operation is made on a planar metallic component to form an irregular surface.

Therefore, according to the above embodiment, the supporting rigidity of the acceleration pedal bracket 32 may be enhanced efficiently because, among the spot welding parts (91a and the like) of the upper end part 91 of the acceleration pedal bracket 32, the position of the spot welding part 91a at the left end, the position of the spot welding part 92a at the low end part 92, and the position of the spot welding part 93a of the central part 93 are respectively set at a position corresponding to the overlapping part 94 formed by the dashboard lower section 10 and the outer flange part 79 of the steering joint cover 21.

In this way, three metallic plates are welded together at once. In other words, the outer flange part 79 of the steering joint cover 21, the dashboard lower section 10, and the acceleration pedal bracket 32 are welded together at once. Since these components are welded together at once, the supporting rigidity of the acceleration pedal bracket 32 may be enhanced.

Furthermore, the steering joint cover 21 is used to enhance the supporting rigidity of the acceleration pedal bracket 32. As a result, it is possible to enhance the freedom in designing a brake pedal (not diagrammed).

In addition, a steering joint cover 21 is provided at the boundary part 71 between the tilted wall 12 and the longitudinal wall 11 of the dashboard lower section 10. As a result, an adequate amount of space may be obtained between the dashboard lower section 10 and the cover main body 78 of the steering joint cover 21. In addition, the attachment clip 85 of the steering grommet 82 is configured to protrude into this space. As a result, the attachment clip 85 is prevented from interfering with the steering joint cover 21. In addition, the universal joint 76 may be surrounded with reliability without making the steering joint cover 21 unnecessarily large.

Furthermore, a sealing material 69 is provided between the dashboard lower section 10 and the outer flange part 79 of the steering joint cover 21. As a result, dust and water may be reliably prevented from entering from between the dashboard lower section 10 and the steering joint cover 21.

In addition, the dashboard cross member 23 is placed along the boundary part 71 of the dashboard lower section 10. An end of the left and right cross member 23a, 23b is spot-welded to the steering joint cover 21. Meanwhile, another end is spot-welded to the corresponding left and right front side frame 4a, 4b. In this way, the dashboard cross member 23 may be fixed firmly. Consequently, the rigidity of the dashboard lower section 10 may be enhanced.

Moreover, the thickness T1 of the steering joint cover 21 is set to be greater than the thickness T2 of the dashboard cross member 23 (see FIG. 6). As a result, it is possible for the steering joint cover 21 to enhance the supporting rigidity of the steering shaft 72 and the universal joint 76.

The present invention is not limited to the embodiment described above. The present invention encompasses multiple variations obtained by varying the embodiment described above within the gist of the present invention.

For example, in the embodiment described above, the first shaft 75 and the second shaft 77 of the steering shaft 72 were connected via the universal joint 76. However, the present invention is not limited to this configuration, as long as the first shaft 75 may be connected with the second shaft 77, and a design layout may be achieved.

Further, according to the above embodiment, an instance was described in which metallic welding of various components was made by spot-welding. However, the present invention is not limited to this embodiment. A known metallic welding method such as arc welding like TIG (Tungsten Inert Gas) welding, MIG (Metallic Inert Gas) welding, and plasma welding; laser welding; and electron beam welding may be used as well, as appropriate.

The invention claimed is:

1. A frontal structure of a vehicle comprising:
   a dashboard lower section;
   a dashboard lower cross member, positioned at a front surface of the dashboard lower section, and divided into a left part and a right part;
   a steering joint cover disposed on the front surface of the dashboard lower section;
   a dashboard cross member integrally formed by connecting and welding the dashboard lower cross member to the steering joint cover; and
   an acceleration pedal bracket fixed to a rear side of the dashboard lower section at a location in which the steering joint cover overlaps the dashboard lower section.

2. A frontal structure of a vehicle comprising:
   a dashboard lower section;
   a steering joint cover provided on a surface of the dashboard lower section at an engine room side;
   a universal joint extending through the dashboard lower section from a steering shaft side to the steering gear box side thereof;
   a dashboard cross member extending along a left and right direction of the dashboard lower section; and
   an acceleration pedal bracket, wherein
   the steering joint cover is formed to surround the universal joint on said steering gear box side of the dashboard lower section;
   the dashboard cross member is divided into a left cross member, positioned at a left side, and a right cross member, positioned at a right side;
   the left cross member is welded to the right cross member via the steering joint cover so as to integrate and unite the left cross member, the right cross member, and the steering joint cover; and
   the acceleration pedal bracket is secured to the steering shaft side of the dashboard lower section at a location in which the dashboard lower section overlaps the steering joint cover.

3. The frontal structure of a vehicle according to claim 2, wherein
   the dashboard lower section comprises a longitudinal wall and a tilted wall, said tilted wall extending and sloping from a lower part of the longitudinal wall towards a rear direction; and
   the steering joint cover is positioned near a boundary part between the longitudinal wall and the tilted wall.

4. The frontal structure of a vehicle according to claim 3, wherein
   the dashboard cross member is positioned along the boundary part between the longitudinal wall and the tilted wall;
   the left cross member is welded to a left front side frame provided at a left side of the dashboard lower section; and
   the right cross member is welded to a right front side frame provided at a right side of the dashboard lower section.

5. The frontal structure of a vehicle according to claim 2, further comprising a sealing material, said sealing material being provided between the steering joint cover and the dashboard lower section to fix the steering joint cover to the dashboard lower section.

6. The frontal structure of a vehicle according to claim 2, wherein
   a thickness of the steering joint cover is greater than a thickness of the dashboard cross member; and
   the dashboard cross member is linear.

7. The frontal structure of a vehicle according to claim 2, wherein:
   the steering joint cover comprises a cover main body which is shaped like a cup expanding towards the engine room side and an outer flange part formed at a rim of an opening of the cover main body, the outer flange part being spot welded to the dashboard lower section;
   the dashboard cross member extends in a vehicle width direction, and a closed cross sectional structure is formed by spot-welding the dashboard cross member towards the engine room side of the dashboard lower section; and the acceleration pedal bracket is provided at a surface of the dashboard lower section at a cabin side, and spot-welding parts of the acceleration pedal bracket are set at a position corresponding to an overlapping part formed by the dashboard lower section and the outer flange part of the steering joint cover.

8. The frontal structure of a vehicle according to claim 7, wherein:

three metallic plates of the outer flange part of the steering joint cover, the dashboard lower section, and the acceleration pedal bracket are welded at once.

9. The frontal structure of a vehicle according to claim 7, wherein:

the rim of the opening of the cover main body is positioned at an outer side of an opening for steering formed on the dashboard lower section;

a grommet attachment hole is formed at both sides of the opening for steering and on inner side of the outer flange part of the steering joint cover; and a steering grommet is attached to the grommet attachment hole so as to protrude toward the cabin side.

10. The frontal structure of a vehicle according to claim 9, wherein:

a flange part of the steering grommet is formed to be larger than the opening for steering, and a cut out portion is formed at a position corresponding to the acceleration pedal bracket.

11. The frontal structure of a vehicle according to claim 7, wherein:

a spot welding part of an upper end part, a spot welding part at a lower end, and a spot welding part at a central part of the acceleration pedal bracket are each positioned at the overlapping part provided by the overlapping of the dashboard lower section and the outer flange part of the steering joint cover.

12. The frontal structure of a vehicle according to claim 2, wherein:

the dashboard lower section comprises a longitudinal wall and a tilted wall, said titled wall extending and sloping from a lower part of the longitudinal wall toward a rear direction;

the steering joint cover is positioned near a boundary part between the longitudinal wall and the tilted wall;

the dashboard cross member is positioned along the boundary part between the longitudinal wall and the tilted wall;

the left cross member is welded to a left front side frame provided at a left side of the dashboard lower section; and the right cross member is welded to a right front side frame provided at a right side of the dashboard lower section.

* * * * *